United States Patent [19]
Grochowski et al.

[11] Patent Number: 5,475,824
[45] Date of Patent: Dec. 12, 1995

[54] MICROPROCESSOR WITH APPARATUS FOR PARALLEL EXECUTION OF INSTRUCTIONS

[75] Inventors: Edward T. Grochowski, San Jose; Kenneth D. Shoemaker, Saratoga; Ahmad Zaidi; Donald B. Alpert, both of Santa Clara, all of Calif.

[73] Assignee: Intel Corporation, Santa Clara, Calif.

[21] Appl. No.: 386,595

[22] Filed: Feb. 10, 1995

Related U.S. Application Data

[63] Continuation of Ser. No. 287,716, Aug. 9, 1994, abandoned, which is a continuation of Ser. No. 823,881, Jan. 23, 1992, abandoned.

[51] Int. Cl.$^6$ .................................................. G06F 9/28
[52] U.S. Cl. ..................... 395/375; 395/800; 364/229.2; 364/232.21; 364/231.8; 364/DIG. 1
[58] Field of Search .................................. 395/375, 800, 395/650, 325

[56] References Cited

U.S. PATENT DOCUMENTS

| | | | |
|---|---|---|---|
| 4,197,579 | 4/1980 | Otis, Jr. et al. | 395/375 |
| 4,236,206 | 11/1980 | Strecker et al. | 395/375 |
| 4,270,181 | 5/1981 | Tamakura et al. | 364/736 |
| 4,424,563 | 1/1984 | Lynch | 395/375 |
| 4,502,111 | 2/1985 | Riffe et al. | 395/375 |
| 4,530,050 | 7/1985 | Fukunaga et al. | 395/375 |
| 4,532,589 | 7/1985 | Shintani et al. | 395/375 |
| 4,670,890 | 6/1987 | Titchener | 375/359 |
| 4,714,994 | 12/1987 | Oklobdzija et al. | 395/375 |
| 4,766,566 | 8/1988 | Chuang | 395/375 |
| 4,811,214 | 3/1989 | Nosenchuck et al. | 395/800 |
| 4,858,105 | 8/1989 | Kuriyama et al. | 395/375 |
| 4,885,680 | 12/1989 | Anthony et al. | 395/425 |
| 5,067,069 | 11/1991 | Fite et al. | 395/375 |
| 5,072,449 | 12/1991 | Enns et al. | 371/37.1 |
| 5,073,855 | 12/1991 | Staplin et al. | 395/375 |
| 5,075,840 | 12/1991 | Grohoski et al. | 395/800 |
| 5,075,844 | 12/1991 | Jardine et al. | 395/375 |
| 5,113,515 | 5/1992 | Fite et al. | 395/425 |
| 5,133,077 | 7/1992 | Karne et al. | 395/800 |
| 5,148,271 | 9/1992 | Kato et al. | 248/390 |

(List continued on next page.)

FOREIGN PATENT DOCUMENTS

| | | |
|---|---|---|
| 0073424 | 8/1981 | European Pat. Off. . |
| 0118830 | 9/1984 | European Pat. Off. . |
| 0239081 | 9/1987 | European Pat. Off. . |
| 0368332 | 5/1990 | European Pat. Off. . |

OTHER PUBLICATIONS

Fu et al., "Performance and Microarchitecture of the i486™ Processor," *Proceedings of 1989 IEEE International Conference on Computers Design: VLSI in Computers and Processors*, 1989, pp. 182–187.

Nakajima, et al.; "Ohmega: A VLSI Superscalar Processor Architecture for Numerical Applications"; *Proceedings: The 18th Annual International Symposium on Computer Architecture;* May 27–30, 1991; pp. 160–168.

*Primary Examiner*—Thomas G. Black
*Assistant Examiner*—Larry J. Ellcessor
*Attorney, Agent, or Firm*—Blakely, Sokoloff, Taylor & Zafman

[57] ABSTRACT

A computer system includes a dual instruction decoder which issues two instructions in parallel within a single clock cycle if their are no register dependencies between the instructions, and instructions fall within a predetermined subset of the complete instruction set. The system includes first and second instruction pipelines. The first pipeline executes any instruction issued from the full instruction set, while the second pipeline only executes a predetermined subset of instructions selected based on principles of locality. A register dependency checker determines whether the destination register of a first instruction is used during the execution of a second instruction in an instruction sequence. When both instructions are within the subset and there are no dependencies, the first and second instructions can be issued in parallel in the first and second pipelines.

14 Claims, 2 Drawing Sheets

U.S. PATENT DOCUMENTS

| | | | |
|---|---|---|---|
| 5,167,026 | 11/1992 | Murray et al. | 395/375 |
| 5,179,680 | 1/1993 | Colwell et al. | 395/425 |
| 5,201,057 | 4/1993 | Uht | 395/800 |
| 5,202,967 | 4/1993 | Matsuzaki et al. | 395/375 |
| 5,202,972 | 4/1993 | Gusefski et al. | 395/425 |
| 5,226,166 | 7/1993 | Ishida et al. | 395/800 |
| 5,233,694 | 8/1993 | Hotta et al. | 395/375 |
| 5,241,636 | 8/1993 | Kohn | 395/375 |
| 5,355,460 | 10/1994 | Eickemeyer et al. | 395/375 |

MICROPROCESSOR WITH APPARATUS FOR PARALLEL EXECUTION OF INSTRUCTIONS

This is a continuation of application Ser. No. 08/287,716, filed Aug. 9, 1994, abandoned, which is a continuation of application Ser. No. 07/823,881, filed Jan. 23, 1992, abandoned.

FIELD OF THE INVENTION

The present invention relates generally to the field of computers; in particular, the invention relates to microprocessor architecture and to ways of improving the speed at which instructions are executed.

BACKGROUND OF THE INVENTION

Computers have historically been designed to execute instructions sequentially; that is, one after another. While sequential execution of computer instructions does provide a logical and orderly method of operation, the ever-present demand to increase processing speed has led researchers to explore ways of implementing a parallel execution scheme.

There are numerous problems which must be overcome if one is to successfully design a computer or microprocessor which is capable of executing multiple instructions in parallel. For example, microprocessors typically have an instruction set architecture which includes hundreds of individual instructions. Counting all of the different kinds of addressing modes for a given architecture, the total number of possible opcodes is likely to number somewhere in the thousands. Pairing all of the thousands of possible first instructions with all the possible second instructions for a given instruction set could easily result in millions of different combinations. Designing a machine which is capable of executing all of these various combinations is a formidable task. It is appreciated that the design complexity can be so great that such a problem becomes unmanageable. Building several decoders which could decode the complete instruction set in a parallel machine capable of executing instruction pairs without large time delays is problematic.

Another associated problem with building a computer capable of parallel execution of instructions is that it must also be able to run software which is designed for prior art machines; that is, machines which operate by sequential execution of instructions—one instruction per clock cycle. In other words, a parallel machine must give the appearance of sequential operation.

As will be seen, the present invention discloses a computer system capable of executing two instructions in a single clock cycle. The invention operates by decoding a pair of instructions selected from a given instruction set and then executes them in parallel to get a correct result. One of the salient features of the present invention is that the computer system only issues two instructions in parallel if there are no register dependencies between the paired instructions.

SUMMARY OF THE INVENTION

A computer system capable of executing two instructions in parallel in a single clock cycle is disclosed. The computer system comprises a dual instruction decoder which only issues two instructions in parallel if their are no register dependencies between the instructions, and both instructions fall within the computer's instruction set.

In one embodiment, the present invention includes first and second instruction pipeline means for execution of computer instructions. The first pipeline means is operable to execute any instruction issued from the full instruction set, while the second pipeline means is restricted to executing a predetermined subset of instructions. The subset is selected based on what are commonly executed instructions.

A register dependency checking means is included for identifying the destination register of the first instruction in a sequence of instructions. The dependency checking means also determines whether the destination register is used during the execution of the second instruction of the sequence. If not, the dependency checking means indicates that a first condition is met. Also included is a means for determining whether the first and second instructions in the sequence are within the predetermined subset. When both instructions are within the subset, the determining means indicates that a second condition is met. Whenever both the first and second conditions are satisfied, the pair of instructions can be issued in parallel.

Another feature of the invention is that the computer system defaults to issuing only the first instruction in the sequence whenever either of the first or second conditions are not met. That is, if the first and second instructions have a register dependency, or one of the instructions is not taken from the predetermined subset, then the machine defaults to a condition wherein only the first instruction is executed in a single clock cycle. For this condition, the second instruction in the sequence is issued during the next clock cycle.

BRIEF DESCRIPTION OF THE DRAWINGS

The present invention will be understood more fully from the detailed description given below and from the accompanying drawings of the preferred embodiment of the invention, which, however should not be taken to limit the invention to the specific embodiment, but are for explanation and understanding only.

DETAILED DESCRIPTION

A microprocessor with an apparatus for executing two instructions in parallel during a single clock cycle is disclosed. In the following description, numerous specific details are set forth, such as specific instruction types, microprocessor types, etc., in order to provide a thorough understanding of the preferred embodiment of the present invention. It will be obvious, however, to one skilled in the art that the present invention may be practiced without these specific details. In other instances, well-known circuits, structures and methods have not been shown in detail in order to avoid obscuring the present invention.

The invention covers an apparatus and method for executing multiple computer instructions in parallel in a single clock cycle. Preferably, the invention is embodied in a microprocessor known as the Pentium™ microprocessor which is manufactured by Intel Corporation. The Pentium™ microprocessor is an improved version Intel's i486™ microprocessor. Details of the architecture of the i486™ microprocessor are described in numerous publications. (Intel, i486™ and Pentium™ are trademarks of Intel Corporation.) Although frequent reference will be made to the Pentium™ architecture in the specification, and examples provided from the x86 or the Intel architecture family of instructions, it is appreciated that the present invention is not limited to these specific machines.

PIPELINING

Pipelining is an implementation technique whereby multiple instructions are simultaneously overlapped in execution. Pipelining is a widely used prior art technique for improving the efficiency and execution speed of the central processing unit (CPU). In a pipeline structure, instructions enter at one end-are processed through the stages or pipe segments—and exit at the other end. Each of the stages of the pipeline completes a part of the instruction.

Figure 1:
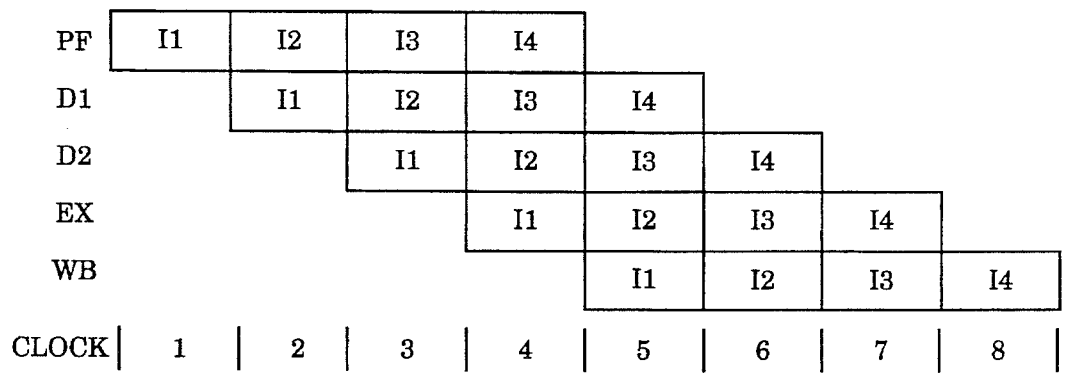
FIG. 1 illustrates the central processing unit pipeline execution structure of a prior art microprocessor.

With reference to FIG. 1, a prior art pipeline structure is illustrated in which the stages of the instruction are denoted by the entries along the left-hand column. The clock time intervals between instruction steps are illustrated by the horizontal numbers. Each step in the pipeline is referred to as a clock cycle or machine cycle.

The first stage of the pipeline is the "PF" stage, which denotes the prefetch portion of the pipeline. In this stage, instructions are prefetched from an on-chip cache memory. The next pipe stage is denoted "D1". In this pipeline stage instructions are decoded and issued. The D2 stage is an address computation stage. Note that in accordance with pipeline principles, while the first instruction (e.g., I1) is being executed in the D1 stage of the second clock cycle, a second instruction (e.g., I2) begins executing its prefetched stage. The "EX" stage of the pipeline indicates the execution of the instruction in hardware, while the "WB" stage denotes a writeback operation. Note that in the prior art structure of FIG. 1, only a single instruction is executed in the pipeline for any given clock cycle.

As discussed earlier, the present invention represents a superscaler machine, which is capable of executing two instructions in parallel during one clock cycle. To accomplish this purpose, the present invention contains two integer pipelines, each of which is capable of executing instructions in a single clock cycle. Thus, the CPU can issue two instructions in parallel in two separate pipelines. In the currently preferred embodiment, the pipelines are referred to as the "u" and "v" pipes. The u-pipe can preferably execute any instruction in the x86 architecture. The v-pipe can execute certain simple instructions, as defined further in a later section of the specification.

Figure 2:
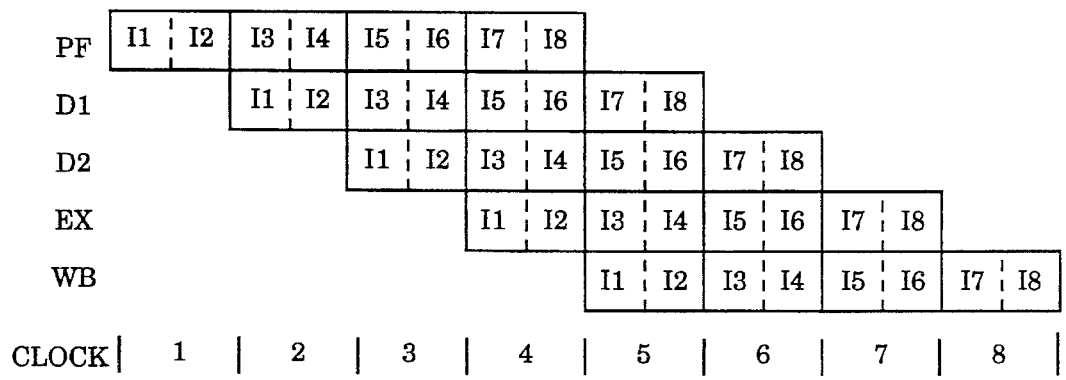
FIG. 2 illustrates the CPU pipeline execution structure of the present invention.

With reference now to FIG. 2, the pipeline structure of the present invention is illustrated. Note that in the pipeline sequence of FIG. 2, two instructions, I1 and I2 are shown being executed at each stage of the pipeline in a single clock cycle. Once again, the first stage of the pipeline is the prefetch stage during which time instructions are prefetched from the on-chip cache. Because the presently invented microprocessor has separate caches for instructions and data, prefetches no longer conflict with data references for access to the cache, as was the case for prior art CPUs. This means that during the prefetch stage the instructions I1 and I2 are fetched directly from the instruction cache and loaded into the u and v pipes. In the next pipe stage (i.e., D1) the instructions I1 and I2 are decoded and issued.

INSTRUCTION ISSUANCE AND PIPELINE SEQUENCING

As stated earlier, the invented microprocessor can issue one or two instructions in a single clock cycle. In order to issue two instructions simultaneously, however, both instructions in the pair must satisfy certain conditions. That is, both instructions in the pair must be within a predefined subset of instructions and free of interdependencies. (This aspect of the invention will be discussed in more detail shortly).

The process of issuing two instructions in parallel is referred to as "instruction pairing". When instructions are paired, the instruction issued to the v-pipe (second pipe) is always the next sequential instruction after the one issued to the u-pipe. Although the instructions may execute in parallel, the behavior as seen by the programmer is exactly the same as if they were executed sequentially (as would be the case for prior art designs). Instructions proceed in parallel through the D2 and EX stages to their completion in the WB stage. During their progression through the pipeline, it is appreciated that instructions may be stalled for any number of reasons. When an instruction in the u-pipe is delayed, for example, then the instruction (if any) issued with it to the v-pipe is also delayed at the same pipeline stage. No successive instructions are allowed to advance to the stalled stage of either pipeline. When an instruction in the v-pipe is stalled, the instruction issued with it in the u-pipe is allowed to advance, while the v-pipe is stalled.

INSTRUCTION PAIRING

The basic idea of the present invention is that the computer system includes a decoding apparatus which only issues two instructions in parallel if there are no register dependencies between them, and if both instructions belong to a subset of instructions eligible for parallel execution. The dual instruction decoder first identifies the destination register for the first instruction in the program sequence. This instruction becomes the u-pipe instruction. The invented apparatus then determines whether the u-pipe instruction is used in any way during the execution of the second instruction in the sequence. If it is not (i.e., the two instructions are independent), then both instructions are issued in parallel.

As discussed earlier, the superscaler machine of the present invention includes two parallel pipes—called the u and v-pipes—which exploits parallelism within the complete instruction set. The instruction unit of the microprocessor always issues the first instruction in the instruction sequence to the u-pipe, and the second instruction to the v-pipe. The v-pipe stalls whenever the u-pipe operand is not accessible or there is an address collision between the pipes. Pairing can only occur between two integer instructions, or two floating point instructions.

In general, instructions may be paired as long as there are no dependencies between them. To issue two integer instructions simultaneously the following conditions have to be satisfied according to the currently preferred embodiment. First, the instruction must belong to a predetermined subset of the x86 instruction set. The instruction subset for pairing of integer instructions is shown below in Table 1.

TABLE 1

| Integer Instruction Subset For Pairing | | | | | |
|---|---|---|---|---|---|
| u-pipe instructions | | | v-pipe instructions | | |
| mov r, r | alu r, i | push r | mov r, r | alu r, i | push r |
| mov r, m | alu m, i | push i | mov r, m | alu m, i | push i |
| mov m, r | alu eax, i | pop r | mov m, r | alu eax, i | pop r |
| mov r, i | alu m, r | nop | mov r, i | alu m, r | jmp near |
| mov m, i | alu r, m | | mov m, i | alu r, m | jcc near |

TABLE 1-continued

Integer Instruction Subset For Pairing

| u-pipe instructions | | v-pipe instructions | | |
|---|---|---|---|---|
| mov eax, m | inc/dec r | mov eax, m | inc/dec r | OF jcc |
| mov m, eax | inc/dec m | mov m, eax | inc/dec m | call near |
| alu r, r | lea r, m | alu r, r | lea r, m | nop |

(Note that in Table 1, the entry "alu r,r" denotes a class of instructions that comprise such instructions as "add," "or," "adc," "sbb," "and," "xor," "cmp".)

The idea of subsetting is an important concept in the present invention since it radically reduces the number possible combinations of different instructions that would have to be handled during parallel execution. The system recognizes that there are a small subset of instructions (approximately twenty) which account for nearly 95% of all the instructions executed by typical software. A collection of the most frequently used instructions are listed in Table 1 above. The use of subsetting means that the dual instruction decoder need not operate on the complete instruction set. Rather, its design can be simplified to greatly improve the timing relationships involved. Use of subsetting also allows the machine to quickly identify the two instructions, decode them rapidly, and then execute them in parallel.

The next important restriction on parallel execution of instructions is that there be no register dependencies between the paired instructions. This means that the destination register of the first instruction cannot be used as the source, destination, base, or index of the next instruction. This requirement holds for explicit and implicit use of registers for the instructions. (Note that the exception to this is the pairing of "push" and "pop" instructions together, for which, in the currently preferred embodiment there exists special hardware in the segmentation unit which updates the stack pointer.) For dependency checking, using any part of the 16/32-bit register is the same as using the entire register. If there is a memory dependency between the u and v-pipe instructions, i.e., both u and v-pipe memory accesses are to the same bank/address of the data cache, the v-pipe cycle is held up until the u-pipe access has finished.

Other restrictions which are peculiar to the current implementation of the Pentium™ microprocessor include:

The v-pipe instruction cannot have a prefix, except 0F Jcc.

The end bit markers in the code cache corresponding to the first instruction must be properly set. (The concept of end bit markers is disclosed in a co-pending patent application assigned to the assignee of the present invention entitled, "End Bit Markers For Instruction Decode," Ser. No. 831, 942, filed Feb. 6, 1992.)

There are enough opcode bytes in the prefetch buffers to decode both instructions.

An instruction in the u or v-pipe can either have a displacement or an immediate but not both.

There cannot be ADC and SBB instructions in the v-pipe (to avoid dependency on the u-pipe carry flag.)

Figure 3:
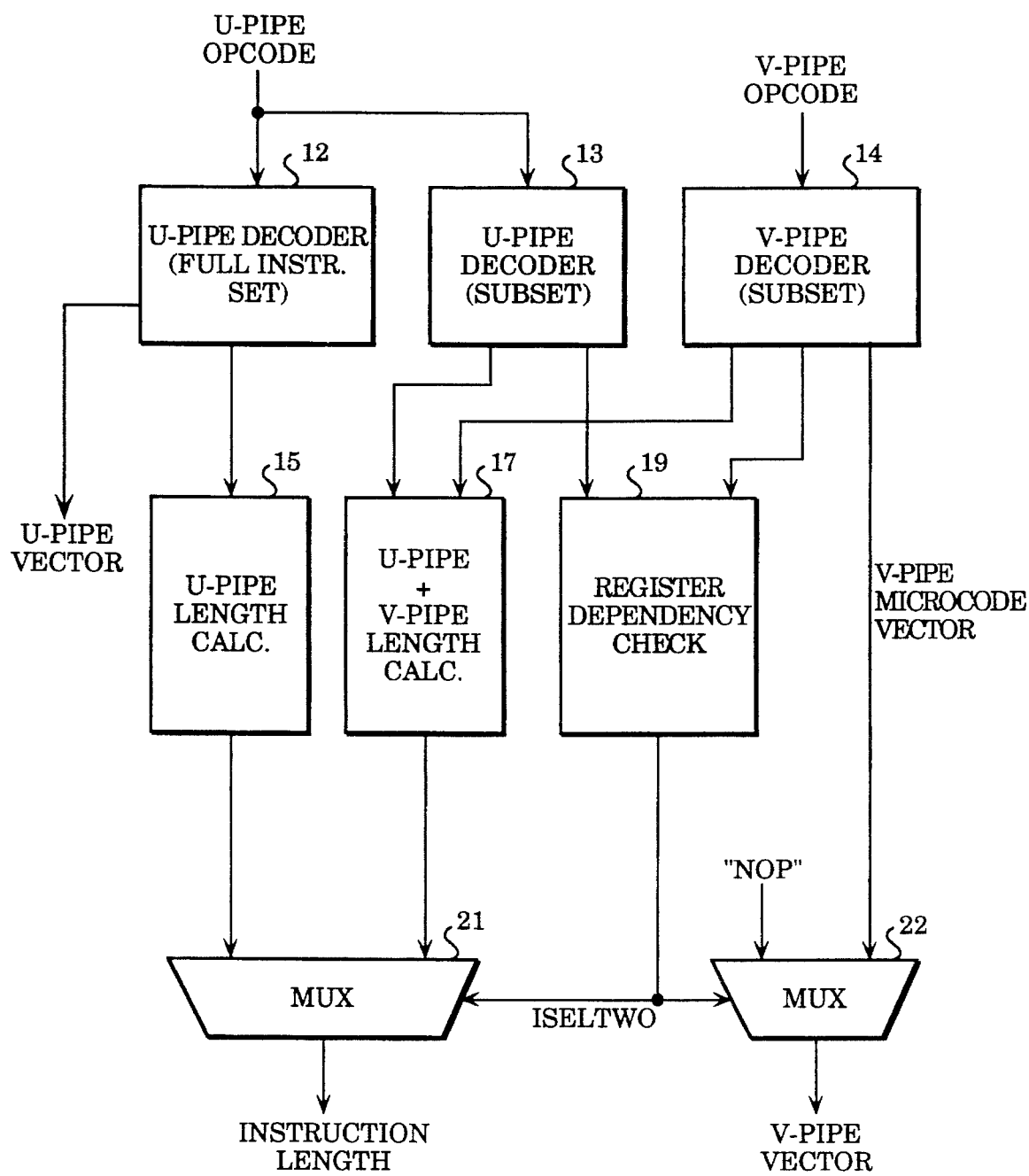
FIG. 3 is a conceptual block diagram of the dual instruction decoder apparatus incorporated within the present invention.

With reference now to FIG. 3 there is shown a block diagram of a dual instruction decoder illustrating the broad concept of the present invention. In FIG. 3 the u-pipe opcode and v-pipe opcode are coupled to decoders 12 and 14, respectively. In addition to being coupled to decoder 12, the u-pipe opcode is also coupled to an additional decoder 13.

Decoders 12, and 14 comprise ordinary programmable logic arrays (PLAs) which do all the decoding of the instructions. For example, decoder 12 generates the first vector of microcode for the u-pipe instruction, while decoder 14 has a similar PLA that generates the first vector of microcode for the v-pipe instruction. Each of the microcode vectors comprise fields which contain information such as the source register location, the destination register, ALU operation information, address computation, and displacement immediate.

Of course, the central feature of the invention is that the dual decoder illustrated in FIG. 3 is capable of issuing either one or two instructions in a single cycle. Since one object of the present invention is to be able to work on all of the x86 family of instructions, the decoder of FIG. 3 is divided into two sections or paths. One path is capable of handling all instructions in the x86 instruction set, while the other path is aimed specifically at handling a second instruction in parallel. In other words, the present invention includes a mode of operation whereby one instruction is executed per clock cycle if the conditions for superscaler operation are not met.

With continuing reference to FIG. 3, the two pipes are very similar except for the fact that the u-pipe functions as the default pipeline when superscaler conditions are not met; This means that the u-pipe path in FIG. 3 is capable of executing all x86 instructions, whereas the v-pipe is aimed only at a subset of the full instruction set. For example, decoders 13 and 14 are specifically designed to decode only a subset of the full x86 instruction set. On the other hand, decoder 12 is capable of decoding the full instruction set when the machine defaults to one instruction per clock cycle. In any conceptual sequence, the u-pipe always represents the first instruction in the sequence and the v-pipe always represents the second instruction in the same sequence.

Register dependency checking is performed by unit 19 which receives outputs from decoders 13 and 14. The outputs of decoders 13 and 14 (which are coupled to unit 19) include information which indicates the destination register of the current instruction. Ordinary logic in unit 19 determines whether a dependency exists in the destination register for each instruction by identifying the destination register of the u-pipe and insuring that it is not used by the v-pipe instruction. At the same time that the register dependency check is being performed, there is also a length calculation which is performed by unit 17. In other words, unit 17 calculates the length of the pair of instructions, i.e. the sum of the u-pipe plus the v-pipe instructions. Unit 15 only calculates the length of the u-pipe instruction.

Conceptually, the outputs of units 15 and 17 are coupled to a multiplexor 21 which outputs the instruction's length. Multiplexor 21 is controlled by a signal ISELTWO which provides basic "issue one/issue two" information output from register dependency check unit 19. The signal ISELTWO is the same signal that is used to conditionally execute the v-pipe instruction by controlling MUX 22. When register dependency check unit 19 determines that only one instruction can be executed, MUX 21 is controlled such that the instruction length is whatever the length of the u-pipe vector is. In the v-pipe, when only one instruction is issued, the control signal ISELTWO selects no operation ("NOP") to be output by multiplexor 22. For such a situation the length comes solely from the u-pipe.

When there is no register dependency, two instructions can be executed in parallel. For this condition, the instruction length output by MUX 21 is selected to be the same as the length calculation of the u and v-pipes together (i.e. the output of unit 17). For this condition, the machine essentially sees the pair as one large instruction. When two instructions are executed in parallel, MUX 22 simply passes the v-pipe microcode vector through to the output of MUX 22. The information at the output of MUXs 21 and 22 is coupled to the execution engine of the microprocessor. The execution engine normally comprises the address computation unit, the arithmetic logic unit (ALU), data paths, register files, etc.

It should be emphasized that all the operations performed by the dual instruction decoder of FIG. 3 are done within one clock cycle. That is, the opcodes are coupled to the inputs of the upper decoders and the vectors are provided by the multiplexing units all within a single clock cycle.

PAIRING EXAMPLES

To better understand and appreciate the present invention consider some of the following examples of sequences of instructions. These sequences also illustrate the important pairing rules discussed earlier. (Note that in the format provided, the destination operand is on the left.)

Consider the following pair of simple instructions.

mov edx, [ebx]

add esi, 4;

In this example, the first instruction in the sequence is a "mov" which will be handled by the u-pipe. The destination register for the u-pipe instruction is edx. Since edx is not used in any manner in the v-pipe "add" instruction, and furthermore, since both instructions are within the instruction subset (see Table 1) the decoder of FIG. 3 can issue both in parallel.

During execution, the first instruction opcode (i.e., "mov") is the u-pipe opcode, wherein "add" is the v-pipe opcode. Upper decoder 12 decodes the "mov" instruction and produces a u-pipe vector which specifies that the destination register is edx. The decoder also specifies that a memory read is necessary—wherein the address is specified by ebx. Decoder 12 also identifies the components of the address calculation and determines that it is a one vector macro instruction. At the same time, the subset decoder 13 looks to see whether "mov" is within the subset of the instructions that are eligible for dual issuance. Decoder 13 also identifies the destination register edx which is used by register dependency checking unit 19. Unit 19 will check edx versus esi and conclude that they are not the same.

On the v-pipeline side, the v-pipe decoder 14 looks at add esi and identifies esi as the destination register (for this example, esi is also the source). Decoder 14 also identifies the immediate component (i.e., 4), and then unit 17 computes the length of the two instructions. The "add" instruction then proceeds down the v-pipe. Thus, because both instructions can be paired and there are no dependencies between them, these two instructions may be paired.

Next, consider the following pairing example.

mov edx [ebx];

add edx, 4;

In this example the destination register for the u-pipe instruction is edx. Since this destination register is also used in the v-pipe instruction, the dependency checking logic determines that both instructions cannot be issued in parallel. For this case, the u-pipe instruction is issued first, while the v-pipe path remains dormant (i.e., v-pipe issues a "NOP"). In the following clock cycle, the "add" instruction is executed in the u-pipe. It should be understood that the add instruction issued in the u-pipe during the next clock cycle may possibly be issued in parallel with whatever instruction follows it in the sequence. In the event that both instructions are issued in parallel the next instruction in the sequence (following the "add" instruction) will be issued in the v-pipe.

Now consider the following example.

lds [ebx];

push eax;

In this example the load instruction "lds" is not included in the subset of instructions eligible for parallel execution (see Table 1). Consequently, the lds instruction gets issued in the u-pipe and in the following clock cycle the "push" instruction gets issued in the u-pipe. In this situation, the u-pipe upper decoder 13 identifies the lds instruction as not being in the eligible subset. This is the case even though there is no dependency between the two instructions. It is important to note that when two instructions cannot be issued in parallel, the v-pipe opcode becomes the u-pipe opcode for the next clock cycle. The next instruction in the sequence then becomes the v-pipe opcode.

It should be understood that the particular list of instructions in the subset of x86 instructions in the currently preferred embodiment may vary in different alternative embodiments. At the same time, various embodiments may permit pairing of certain instructions for which there is an implicit dependency if there exists special hardware to allow both instructions to be issued and be executed in parallel. By way of example, the currently preferred embodiment includes special hardware which allows it to execute the following instructions in parallel:

cmp edx, 0;

jnz loop

For the above example, although there is an implicit dependency on the z flag, the microprocessor includes special hardware to allow these instructions to be issued and executed in parallel.

For pairing two floating point instructions, the last three conditions listed for integer instruction pairing along with the memory dependency checking do not apply in the current embodiment. The reason for this is that floating point instructions do not have immediate bytes. Also, register dependency is allowed between the u-pipe instructions and the FXCH instruction in the v-pipe. Since FXCH is a register-register instruction, memory dependency does not apply. The subset of floating point instructions that can be paired in either pipe is listed below in Table 2 for the currently preferred embodiment. All of them are one vector instructions.

TABLE 2

| Floating Point Instruction Subset For Pairing | | | |
|---|---|---|---|
| u-pipe instructions | | | v-pipe instructions |
| fsub | fsqrt | fld | fxch |
| fadd | fdiv | fchs | |
| fmul | fnop | ftst | |
| fcom | fucom | | |

Whereas many alternations and modifications to the present invention will no doubt become apparent to the person of ordinary skill in the art after having read the forgoing description, it is to be understood that the particular embodiments shown and described by way of illustration are in no way intended to be considered limiting. For example, although this disclosure has shown a particular set of conditions and rules to be satisfied, other conditions may also be relied upon without detracting from the spirit or scope of the present invention. Therefore, reference to the details of the illustrated diagrams is not intended to limit the scope of the claims which themselves recite only those features regarded as essential to the invention.

What is claimed is:

1. A complex instruction set computer (CISC) for executing a sequence of instructions comprising:

first and second instruction pipelines for executing a set of complex instructions that includes instructions of variable length, said first instruction pipeline being operable to execute any one of a plurality of complex instructions issued from said set of complex instructions, said second instruction pipeline being operable to execute a subset of instructions from said set of complex instructions;

dependency checking logic identifying a destination register of a first instruction in said sequence of complex instructions, said checking logic determining whether said destination register is used during the execution of a second instruction in said sequence, if not, said dependency checking logic producing a signal indicating that a first condition is met;

means for determining whether said first and second instructions in said sequence are both within a subset of pairable instructions, when both of said first and second instructions are within said subset of pairable instructions said determining means indicating that a second condition is met;

means for calculating a combined length of said first and second instructions; and instruction pairing circuitry for issuing said first and second instructions in parallel whenever said first and second conditions are met, said instruction pairing circuitry only issuing said first instruction in said sequence to said first pipeline whenever either of said first or second conditions are not met.

2. The CISC of claim 1 wherein said first and second instructions each comprise integer instructions.

3. The CISC of claim 1 wherein said first and second instructions each comprise floating point instructions.

4. A microprocessor of a computer system for running a program comprising a sequence of complex instructions selected from a set of complex instructions of variable length, said microprocessor comprising:

an instruction execution engine;

first and second instruction pipelines for executing said sequence of complex instructions wherein multiple instructions can be simultaneously executed in parallel;

instruction decoding means for decoding first and second instructions in said sequence of complex instructions to produce first and second microcode vectors in said first and second instruction pipelines, respectively, and for determining whether said first and second instructions are included within a subset of most frequently executed instructions of said set of complex instructions;

calculating means for calculating a first length of said first instruction, and a second length of said first and second instructions;

means for determining whether a register dependency exists between said first and second instructions, said determining means producing a signal in a first state whenever said register dependency exists, said signal being in a second state whenever said register dependency is non-existent; and means for issuing said first and second microcode vectors and said second length to said execution engine whenever said signal is in said second state and said first and second instructions are included within said subset, said issuing means issuing said first microcode vector and said first length otherwise.

5. The microprocessor of claim 4 wherein said first and second instruction pipelines have a throughput of one instruction per clock cycle whenever said signal is received by said issuing means and said first and second instructions are included within said subset.

6. The microprocessor of claim 5 wherein said first and second instructions comprise integer instructions.

7. The microprocessor of claim 5 wherein said first and second instructions comprise floating point instructions.

8. A complex instruction set computer (CISC) for parallel execution of a pair of instructions selected from a complex instruction set, said set including instructions of variable length, said computer comprising:

an execution engine;

a first decoder for decoding a first one of said pair of instructions into a first microcode vector;

second and third decoders, said third decoder for decoding said first one of said pair of instructions, said second decoder for decoding a second one of said pair of instructions into a second microcode vector;

a circuit coupled to said second and third decoders for generating a first logic signal when a register dependency exists between said pair of instructions, and a second logic signal otherwise;

means coupled to said first, second, and third decoders for calculating first and second instruction lengths, said first instruction length representing the length of said first one of said pair of instructions, and said second instruction length representing the combined length of said pair of instructions; and means for coupling said first and second microcode vectors and said second instruction length to said execution engine in response to said second logic signal.

9. The CISC of claim 8 further comprising an instruction cache for storing said pair of instructions.

10. The CISC of claim 9 wherein said first and second microcode vectors contain source register, destination register, and address computation information.

11. The CISC of claim 8 wherein said first decoder comprises a programmable logic array.

12. The CISC of claim 11 wherein said second and third decoders comprise programmable logic arrays.

13. The CISC of claim 8 wherein said coupling means provides said first microcode vector and said first instruction length to said execution engine in response to said first logic signal.

14. The CISC of claims 1, 2 or 3 wherein said subset comprises approximately twenty instructions.

* * * * *

UNITED STATES PATENT AND TRADEMARK OFFICE
CERTIFICATE OF CORRECTION

PATENT NO. : 5,475,824
DATED : December 12, 1995
INVENTOR(S) : Grochowski et al.

It is certified that error appears in the above-identified patent and that said Letters Patent is hereby corrected as shown below:

In column 3 at line 42 delete "cycle"

In column 6 at line 1 insert --13,-- following "12," and before "and"

In column 10 at lines 15-17 delete "instruction pipelines have a throughput of one instruction per clock cycle whenever said signal is received by said issuing means" and insert --instructions are executed within one clock cycle of said system whenever said signal is received by said multiplexing means--

Signed and Sealed this

Twenty-seventh Day of August, 1996

Attest:

BRUCE LEHMAN

Attesting Officer

Commissioner of Patents and Trademarks